US012508810B2

(12) United States Patent
Kobayashi

(10) Patent No.: US 12,508,810 B2
(45) Date of Patent: Dec. 30, 2025

(54) LIQUID DISCHARGE APPARATUS AND CLEANING METHOD

(71) Applicant: Yuta Kobayashi, Tokyo (JP)

(72) Inventor: Yuta Kobayashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 174 days.

(21) Appl. No.: 18/373,297

(22) Filed: Sep. 27, 2023

(65) Prior Publication Data

US 2024/0100837 A1 Mar. 28, 2024

(30) Foreign Application Priority Data

Sep. 28, 2022 (JP) ................................ 2022-155225

(51) Int. Cl.

*B41J 2/165* (2006.01)
*B41J 2/17* (2006.01)

(52) U.S. Cl.

CPC ....... *B41J 2/16552* (2013.01); *B41J 2/16508* (2013.01); *B41J 2/16523* (2013.01); *B41J 2/1721* (2013.01); *B41J 2002/16558* (2013.01); *B41J 2/1728* (2024.05)

(58) Field of Classification Search

CPC ................ B41J 2/16552; B41J 2/16508; B41J 2/16523; B41J 2/1721; B41J 2/1728; B41J 2002/16558

See application file for complete search history.

(56) References Cited

U.S. PATENT DOCUMENTS

| | | | | |
|---|---|---|---|---|
| 2008/0218564 | A1 | 9/2008 | Kubo | |
| 2021/0394516 | A1* | 12/2021 | Takahashi | B41J 2/16523 |

FOREIGN PATENT DOCUMENTS

| | | | | |
|---|---|---|---|---|
| JP | 2008-049631 | A | | 3/2008 |
| JP | 2016002721 | A | * | 1/2016 |
| JP | 2019-001028 | A | | 1/2019 |
| JP | 2022-059030 | A | | 4/2022 |

* cited by examiner

*Primary Examiner* — Sharon Polk
(74) *Attorney, Agent, or Firm* — XSENSUS LLP

(57) ABSTRACT

A liquid discharge apparatus includes a liquid discharge head, a cap, a waste liquid channel, a wiper, a cleaner, and a cleaning liquid drainage. The liquid discharge head has a nozzle, from which a liquid is discharged, on a nozzle face. The cap caps the nozzle to suck a waste liquid from the nozzle. The waste liquid channel is connected to the cap and has a waste liquid outlet from which the waste liquid is drained. The wiper wipes the nozzle face. The cleaner applies a cleaning liquid to the wiper. The cleaning liquid drainage drains the cleaning liquid applied to the wiper to the waste liquid outlet.

18 Claims, 6 Drawing Sheets

LIQUID DISCHARGE APPARATUS AND CLEANING METHOD

CROSS-REFERENCE TO RELATED APPLICATION

This patent application is based on and claims priority pursuant to 35 U.S.C. § 119(a) to Japanese Patent Application No. 2022-155225, filed on Sep. 28, 2022, in the Japan Patent Office, the entire disclosure of which is hereby incorporated by reference herein.

BACKGROUND

Technical Field

Embodiments of the present disclosure relate to a liquid discharge apparatus and a cleaning method of the liquid discharge apparatus.

Related Art

In the related art, a liquid discharge apparatus discharges a liquid from a nozzle of a liquid discharge head. A cap caps and sucks the nozzle to drain a waste liquid remaining in the nozzle and the surrounding thereof to clean the liquid discharge head. The waste liquid sucked by the cap is drained through a waste liquid channel communicating with the cap.

SUMMARY

Embodiments of the present disclosure describe an improved liquid discharge apparatus that includes a liquid discharge head, a cap, a waste liquid channel, a wiper, a cleaner, and a cleaning liquid drainage. The liquid discharge head has a nozzle, from which a liquid is discharged, on a nozzle face. The cap caps the nozzle to suck a waste liquid from the nozzle. The waste liquid channel is connected to the cap and has a waste liquid outlet from which the waste liquid is drained. The wiper wipes the nozzle face. The cleaner applies a cleaning liquid to the wiper. The cleaning liquid drainage drains the cleaning liquid applied to the wiper to the waste liquid outlet.

According to another embodiment of the present disclosure, there are provided a cleaning method of a liquid discharge apparatus includes capping a nozzle on a nozzle face of a liquid discharge head, sucking a waste liquid from the nozzle while the nozzle is capped, draining the waste liquid from a waste liquid outlet through a waste liquid channel, wiping the nozzle face with a wiper, applying a cleaning liquid to the wiper, and draining the cleaning liquid applied to the wiper to the waste liquid outlet.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
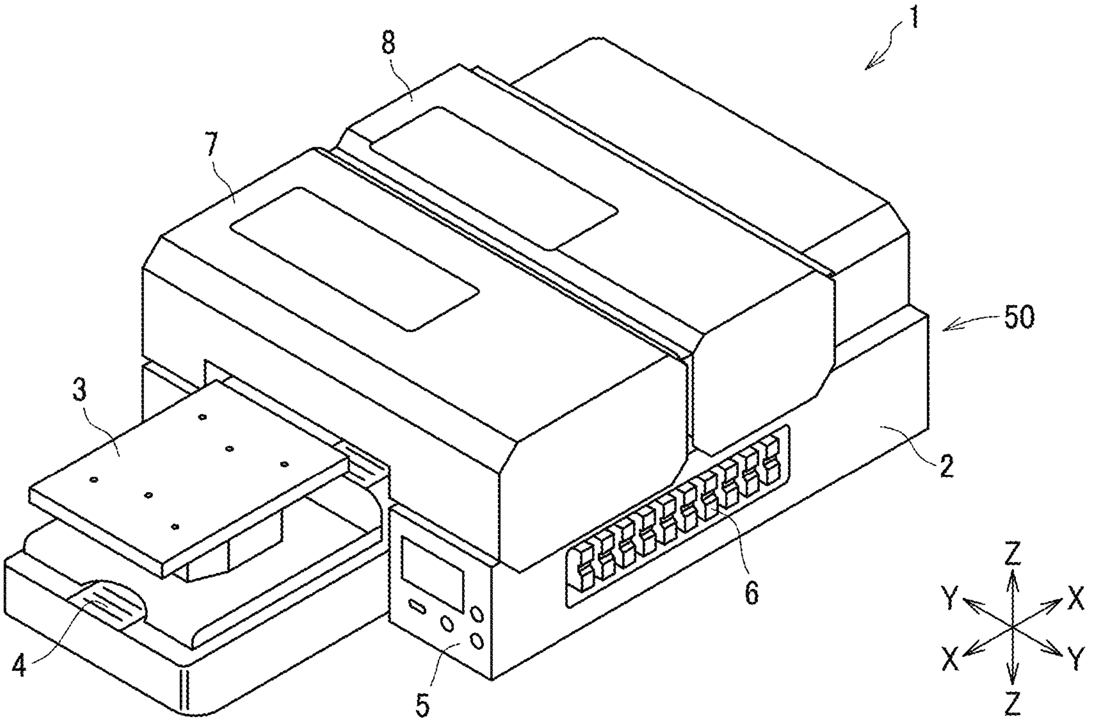
FIG. 1 is a perspective view of a liquid discharge apparatus according to an embodiment of the present disclosure, with covers closed.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate.

Figure 2:
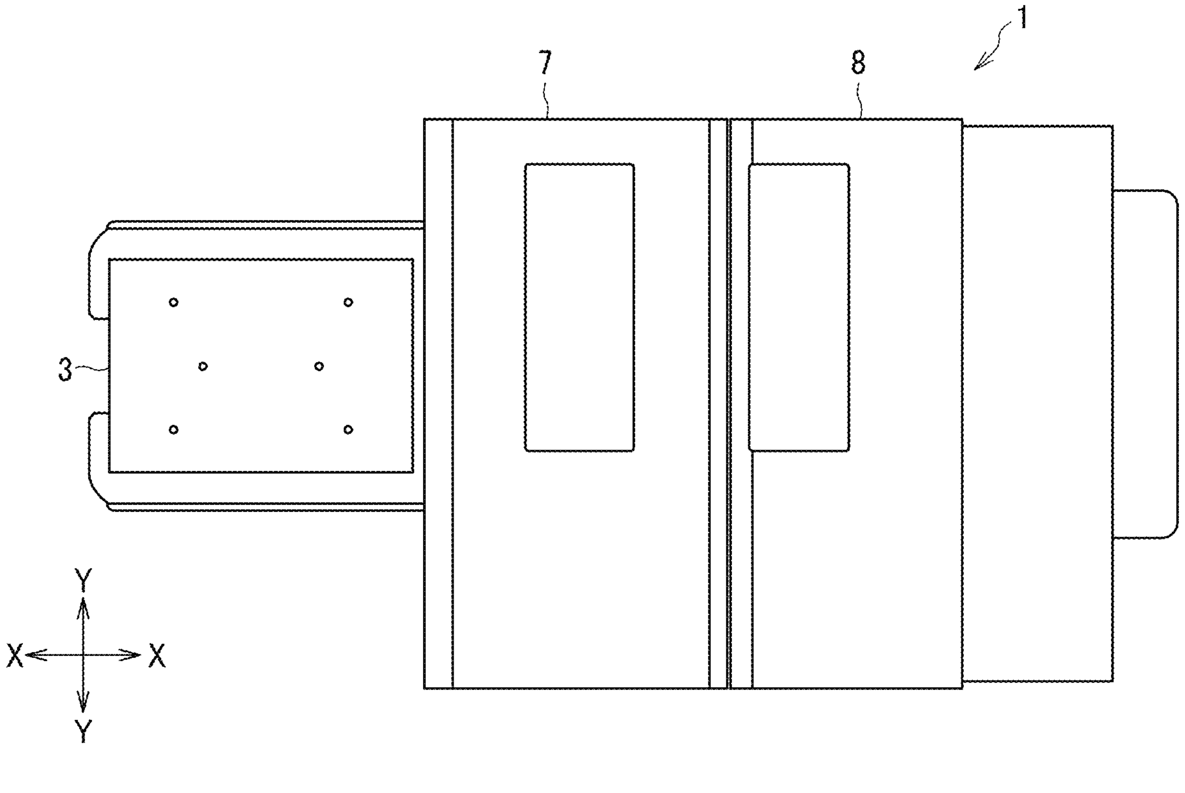
FIG. 2 is a plan view of the liquid discharge apparatus illustrated in FIG. 1.
Figure 3:
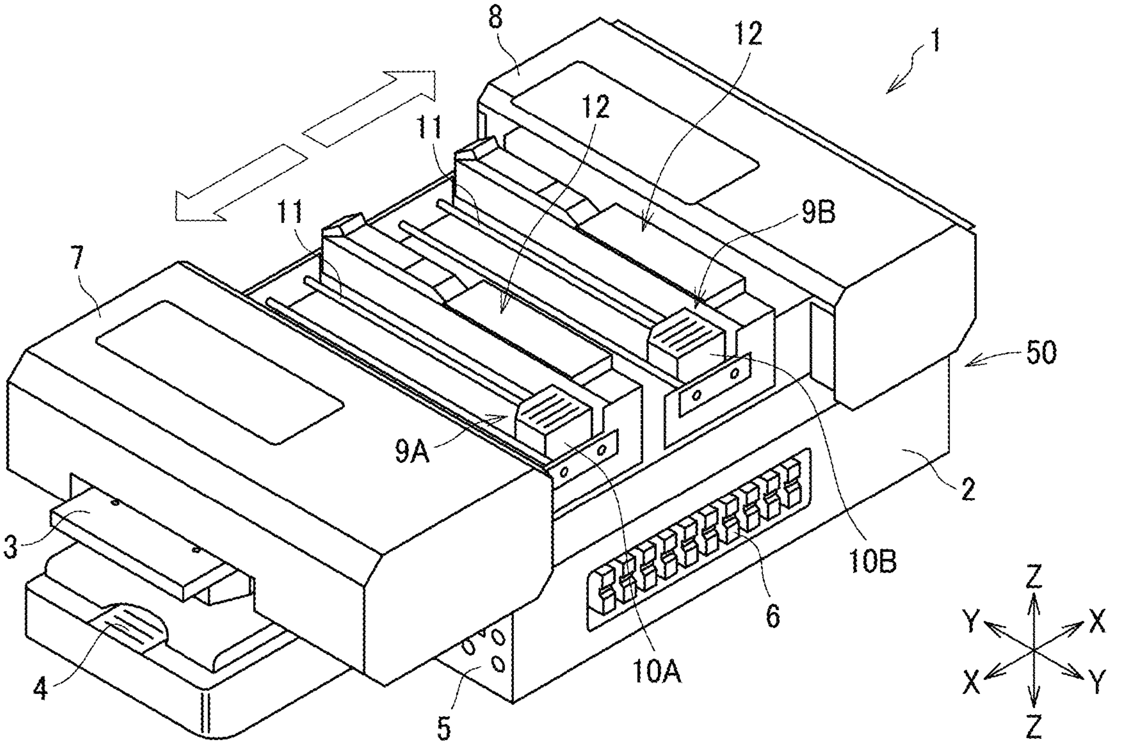
FIG. 3 is a perspective view of the liquid discharge apparatus of FIG. 1 with the covers open.
Figure 4:
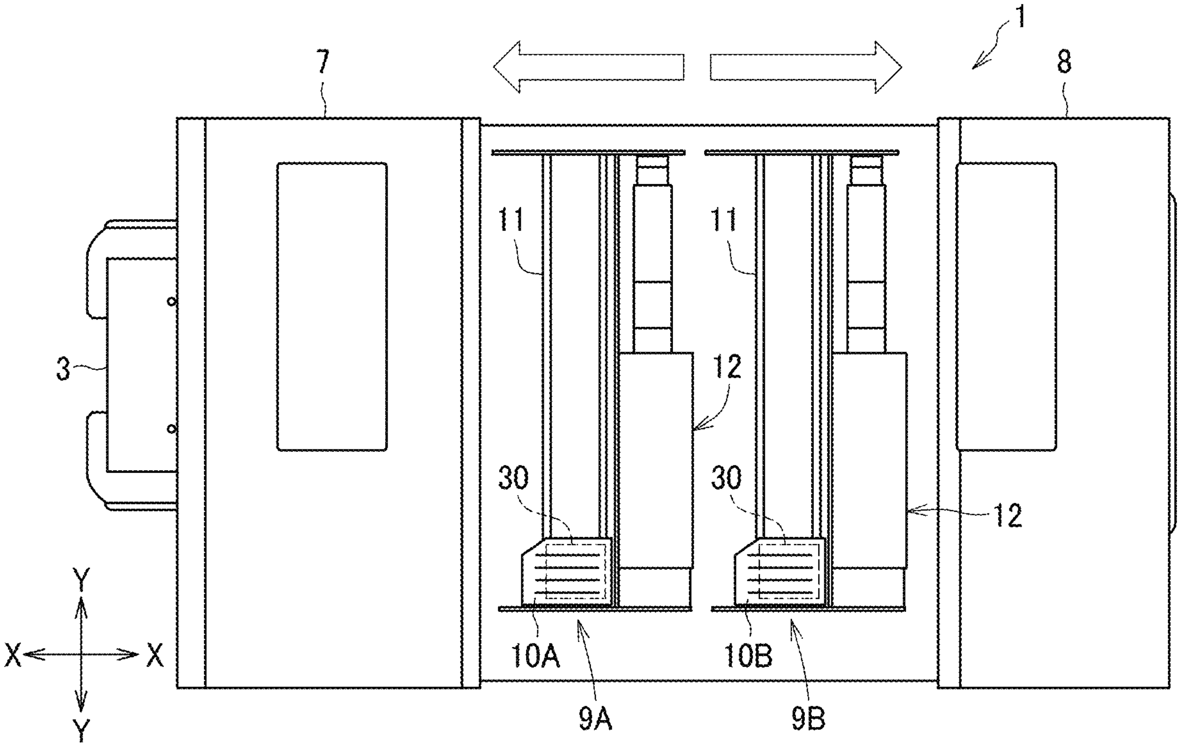
FIG. 4 is a plan view of the liquid discharge apparatus illustrated in FIG. 3.

FIG. 1 is a perspective view of a liquid discharge apparatus 1 according to an embodiment of the present disclosure, with covers closed, and FIG. 2 is a plan view thereof. FIG. 3 is a perspective view of the liquid discharge apparatus 1 with the covers open, and FIG. 4 is a plan view thereof. X directions in FIG. 1 are a front-rear direction, a sub-scanning direction, and a recording medium conveyance direction of the liquid discharge apparatus 1. Y directions in FIG. 1 are a transverse direction and a main scanning direction of the liquid discharge apparatus 1. Z directions in FIG. 1 are a vertical direction. The X directions and the Y directions are parallel to a surface, onto which a liquid is discharged, of a recording medium on a stage 3, but may have some error. The X, Y, and Z directions are orthogonal to each other.

As illustrated in FIGS. 1 and 2, the liquid discharge apparatus 1 includes the stage 3 in front of a housing 2. The stage 3 is mounted on a guide rail 4. The guide rail 4 extends in the X directions. A control panel 5 is disposed on a front face of the housing 2. An ink cartridge 6 is detachably attached to a side face of the housing 2. A front cover 7 and a rear cover 8 as covers are disposed over the housing 2.

The stage 3 has a flat upper face on which the recording medium is placed. The upper face of the stage 3 is parallel to the X directions and the Y directions. The stage 3 moves on the guide rail 4 to reciprocate in both the X directions. The stage 3 is movable up and down in the Z directions. Thus, the height of the recording medium placed on the stage 3 is adjustable.

The front cover 7 and the rear cover 8 are movable in both the X directions. In FIG. 1, the front cover 7 has been moved backward and the rear cover 8 has been moved forward to close the front cover 7 and the rear cover 8. On the other hand, in FIG. 3, the front cover 7 is moved forward and the rear cover 8 is moved backward to open the front cover 7 and the rear cover 8. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 3 and 4, an apparatus body 50 of the liquid discharge apparatus 1 includes, for example, the housing 2, liquid discharge units 9A and 9B mounted on the housing 2, and a maintenance unit 30. In the present embodiment, specifically, the apparatus body 50 is a portion of the liquid discharge apparatus 1 other than the front cover 7, the rear cover 8, and a waste liquid bottle 39 (see FIG. 5). The front cover 7 and the rear cover 8 are slidable in the X directions relative to the apparatus body 50.

The front cover 7 and the rear cover 8 are opened to expose the liquid discharge units 9A and 9B to the outside of the liquid discharge apparatus 1. When the liquid discharge units 9A and 9B are exposed to the outside, an operator can clean the maintenance unit 30, a liquid discharge head 20 (see FIG. 5), and the surrounding thereof, or can replace carriages 10A and 10B. The front cover 7 and the rear cover 8 are closed during image formation. As a result, the liquid discharge units 9A and 9B are covered by the front cover 7 and the rear cover 8 to block access to operation units such as the carriages 10A and 10B of the liquid discharge units 9A and 9B from the outside. The liquid discharge units 9A and 9B are disposed in the closed space in the front cover 7 or the rear cover 8. Accordingly, mist of ink (an example of a liquid) is prevented from scattering to environs outside the liquid discharge apparatus 1 while the liquid discharge head 20 discharges the ink to the recording medium (i.e., during liquid discharge operation). Further, the liquid discharge units 9A and 9B may include a fan to circulate an airflow in the front cover 7 or the rear cover 8, thereby collecting the generated mist of the ink in the front cover 7 or the rear cover 8.

The liquid discharge apparatus 1 according to the present embodiment includes the two liquid discharge units 9A and 9B arranged side by side in the X directions. The liquid discharge unit 9A discharges color ink and white ink. The liquid discharge unit 9B discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the recording medium is a fabric, the pretreatment liquid is preferably applied to the recording medium before the image formation using the ink. In other words, one of the liquid discharge units 9A and 9B preferably discharges the pretreatment liquid.

Since the liquid discharge units 9A and 9B have similar configurations, the liquid discharge unit 9A is described below. The liquid discharge unit 9A includes a carriage 10A, a guide rod 11, and an electrical component unit 12 including, for example, a board and an electrical component cover. The liquid discharge units 9A and 9B and the carriages 10A and 10B are also referred to simply as a liquid discharge unit 9 and a carriage 10, respectively, unless distinguished.

The guide rod 11 extends in the main scanning direction. The carriage 10 is movable in the main scanning direction along the guide rod 11. The carriage 10 includes multiple liquid discharge heads 20. The maintenance unit 30 is disposed at a position facing the guide rod 11 on one side in the transverse direction (Y directions).

A process of forming an image on the recording medium by the liquid discharge head 20 is described below.

The recording medium is placed on the stage 3 and conveyed along the guide rail 4. The recording medium is conveyed to a rear side of the liquid discharge apparatus 1, and the pretreatment liquid is applied to the recording medium by the liquid discharge unit 9B. Specifically, while the carriage 10B moves in the main scanning direction along the guide rod 11, the liquid discharge unit 9B discharges the pretreatment liquid from nozzles of the liquid discharge head 20 of the carriage 10B, which is disposed at a predetermined position in the sub-scanning direction, to apply the pretreatment liquid to the entire width of the recording medium in the main scanning direction. Subsequently, the stage 3 moves to change the position of the recording medium to which the pretreatment liquid is applied in the sub-scanning direction, and such operations are repeated. Thus, the pretreatment liquid is applied to the recording medium. After that, the stage 3 moves forward, and the liquid discharge unit 9A discharges the color ink of multiple colors onto the recording medium by a similar method by the liquid discharge unit 9B. When white color is printed on the recording medium, for example, the liquid discharge unit 9A discharges the white ink onto the recording medium, the stage 3 moves to the rear side of the liquid discharge unit 9A again, and the liquid discharge unit 9A discharges the color ink onto the recording medium. Thus, an image is formed on the recording medium.

The liquid discharge apparatus 1 includes the maintenance unit 30 that maintains the liquid discharge head 20 of the liquid discharge unit 9A. The maintenance unit 30 is disposed on one side in the main scanning direction, which is a moving direction of the carriage 10A, outside the range where the liquid discharge head 20 discharges the liquid to the recording medium. The maintenance unit 30 is described below.

Figure 5:
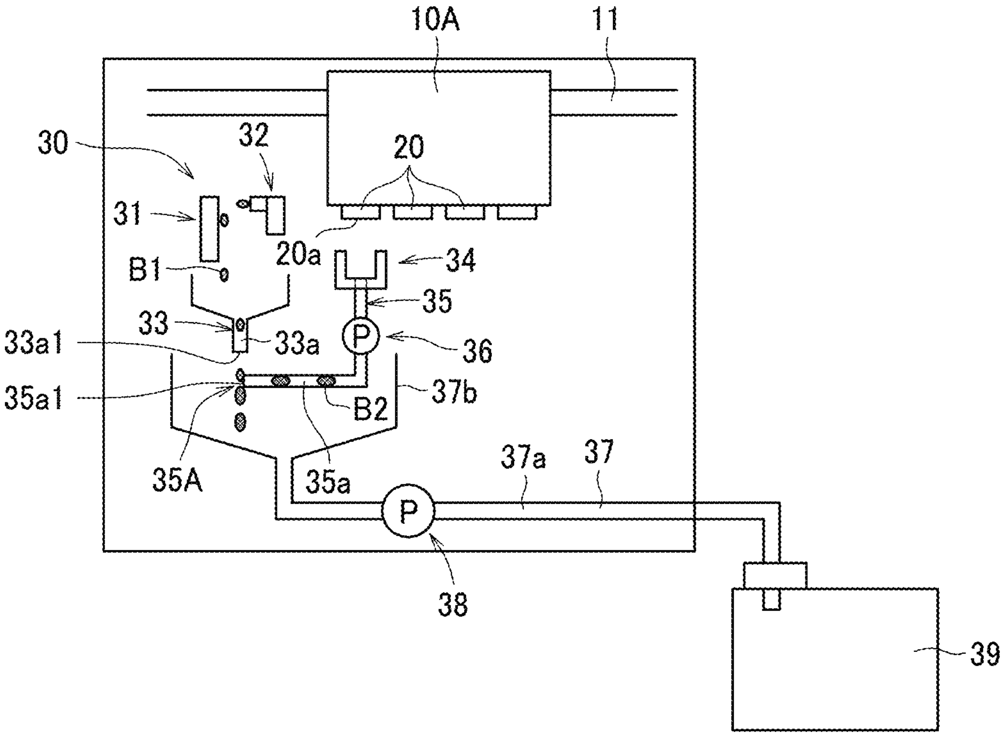
FIG. 5 is a schematic view of a maintenance unit of the liquid discharge apparatus of FIG. 1.

As illustrated in FIG. 5, the carriage 10A includes the multiple liquid discharge heads 20. The liquid discharge head 20 has multiple nozzles and a nozzle face 20*a* on which opening ends of the multiple nozzles are arranged. The liquid discharge head 20 discharges ink from the opening ends of the multiple nozzles to the recording medium.

The maintenance unit 30 includes a rubber wiper 31 as a wiper, a cleaner 32, a cleaning liquid channel formation component 33 including a cleaning liquid channel 33*a*, a head suction cap 34 as a cap, a waste liquid channel formation component 35 including a waste liquid channel 35*a*, a head suction pump 36 as a suction device, a drain channel formation component 37 including a drain channel 37*a*, a drain pump 38, and the waste liquid bottle 39. The waste liquid bottle 39 is disposed outside the apparatus body 50 (see FIG. 1) of the liquid discharge apparatus 1.

The rubber wiper 31 wipes the nozzle face 20*a* of the liquid discharge head 20 to remove, for example, a waste liquid B2 adhering to the nozzle face 20*a*. The rubber wiper 31 according to the present embodiment has a sheet shape and has elasticity. The cleaner 32 sprays (applies) a cleaning liquid B1 onto the rubber wiper 31. The wiped waste liquid B2 adheres to the rubber wiper 31. For this reason, the cleaner 32 sprays the cleaning liquid B1 to wash, for example, the waste liquid B2 off from the rubber wiper 31 to clean the rubber wiper 31. Thus, the rubber wiper 31 can wipe the nozzle face 20*a* of the liquid discharge head 20 at any time. The cleaning liquid B1 that facilitates dissolving or removing the waste liquid B2 of ink discharged from the liquid discharge head 20 is used.

The cleaning liquid channel formation component 33 is disposed below the rubber wiper 31. The cleaning liquid channel formation component 33 is also referred to as a cleaning liquid drainage. The cleaning liquid B1 sprayed on the rubber wiper 31 falls along the rubber wiper 31 and flows into the cleaning liquid channel 33*a*.

The head suction pump 36 is disposed in the middle of the waste liquid channel 35*a*. The waste liquid channel 35*a* communicates with the head suction cap 34. Specifically, an opening end which is an inlet of the waste liquid channel 35*a* communicates with an inner face of the head suction cap 34. When the head suction cap 34 is attached to the liquid discharge head 20, the inner face of the head suction cap 34 covers the nozzle face 20*a* of the liquid discharge head 20 (in other words, the head suction cap 34 caps the nozzles). The head suction pump 36 sucks the head suction cap 34 under these conditions to take the waste liquid B2 adhering to the liquid discharge head 20 into the waste liquid channel 35*a* from the head suction cap 34. As a result, the waste liquid B2 adhering to the nozzle face 20*a* or in the nozzles is removed. Such a configuration prevents the waste liquid B2 from adhering to and accumulating in the nozzles, on the nozzle face 20*a*, and the surrounding thereof of the liquid discharge head 20.

The drain channel formation component 37 is disposed below the cleaning liquid channel 33*a* and the waste liquid channel 35*a*. The drain channel formation component 37 includes a drain channel 37*a* through which the cleaning liquid B1 and the waste liquid B2 flow. A receiver 37*b* is disposed below the cleaning liquid channel 33*a* and the waste liquid channel 35*a* to receive the cleaning liquid B1 and the waste liquid B2. A drain pump 38 is disposed in the middle of the drain channel 37*a*. An outlet of the drain channel 37*a* communicates with the waste liquid bottle 39. The waste liquid B2 and the cleaning liquid B1 drained from the waste liquid channel 35*a* and the cleaning liquid channel 33*a* are sent to the waste liquid bottle 39 through the drain channel 37*a* by a suction operation by the drain pump 38.

Figure 6:
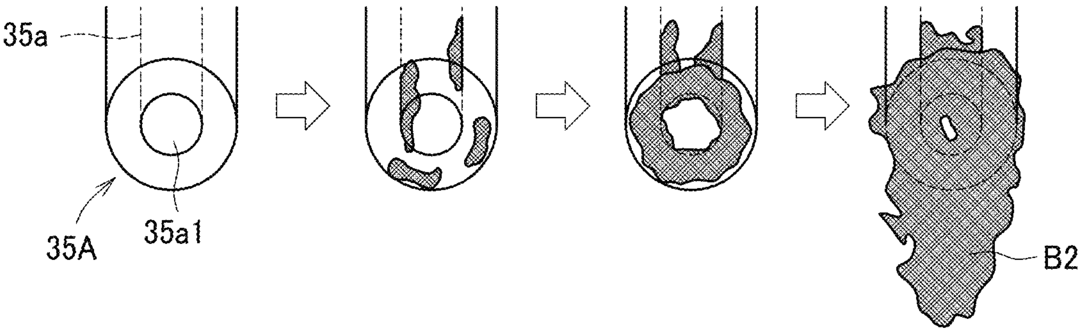
FIG. 6 is a diagram illustrating a waste liquid that adheres to and accumulates on an outlet of a waste liquid channel formation component of the maintenance unit illustrated in FIG. 5.

The waste liquid B2 drained through the waste liquid channel 35*a* is likely to thicken and dry. Accordingly, while the suction operation of the waste liquid B2 from the liquid discharge head 20 is repeated as described above, the waste liquid B2 is likely to adhere to and accumulate on an outlet region 35A of the waste liquid channel formation component 35 including an outlet 35*a*1 (i.e., a waste liquid outlet) of the waste liquid channel 35*a*. For example, as indicated by blank arrows from the left side to the right side in FIG. 6, the waste liquid B2 adhering to the outlet region 35A increasingly accumulates. As a result, the waste liquid channel 35*a* may be clogged with the waste liquid B2, thereby hindering a cleaning operation. In particular, when the liquid discharge apparatus 1 is used under low humidity and high temperature, the waste liquid B2 is more likely to dry.

A configuration of the liquid discharge apparatus 1 according to the present embodiment and a method of cleaning the waste liquid channel 35*a* of the liquid discharge apparatus 1, which prevent the adhesion and accumulation of the waste liquid B2 at the outlet region 35A due to drying of the waste liquid B2, are described below.

In the present embodiment, the cleaning liquid B1 that has cleaned the rubber wiper 31 flows to the outlet region 35A to remove the waste liquid B2 adhering to the outlet region 35A. The outlet region 35A of the waste liquid channel formation component 35 includes the outlet 35*a*1 which is the opening end of the waste liquid channel 35*a* and the surrounding thereof. In other words, the outlet region 35A includes the outlet 35*a*1 of the waste liquid channel 35*a*, an end face of the waste liquid channel formation component 35 having the outlet 35*a*1, and an outer circumferential face of the waste liquid channel formation component 35 continuous with the end face. However, the cleaning liquid B1 may not flow to the entire region, and for example, the cleaning liquid B1 may flow to the outlet 35*a*1 of the waste liquid channel 35*a* and the end face of the waste liquid channel formation component 35 having the outlet 35*a*1. This is because the waste liquid B2 is likely to adhere to the outlet 35*a*1 and the end face.

Specifically, in the present embodiment, an outlet 33*a*1 (i.e., a cleaning liquid outlet) of the cleaning liquid channel 33*a* is disposed directly above the outlet region 35A of the waste liquid channel formation component 35. Accordingly, the cleaning liquid B1 drained from the outlet 33*a*1 flows to the outlet region 35A under gravity. The cleaning liquid B1 washes away the waste liquid 132 adhering to the outlet region 35A to the drain channel 37*a*. Alternatively, the cleaning liquid B1 prevents the waste liquid B2 adhering to the outlet region 35A from drying. Due to such a configuration, the waste liquid B2 is prevented from adhering to and accumulating on the outlet region 35A, thereby preventing failure of the cleaning operation due to clogging of the waste liquid channel 35*a*. As described above, the outlet region 35A of the waste liquid channel 35*a* can be cleaned with the cleaning liquid B1 that has cleaned the rubber wiper 31 without an additional cleaning mechanism for cleaning the outlet region 35A. As described above, the cleaning liquid B1 that facilitates dissolving or removing the waste liquid B2 is used, thereby efficiently cleaning the outlet region 35A.

Since the ink discharged from the liquid discharge unit 9A is likely to dry and adhere, the maintenance unit 30 described above is provided for the liquid discharge unit 9A in the present embodiment. However, the maintenance unit 30 may also be provided for the liquid discharge unit 9B.

An example of a procedure of a maintenance operation performed by the maintenance unit 30 is described below. The maintenance operation is performed while the liquid discharge head 20 does not discharge ink (liquid). When the maintenance operation is performed, first, the carriage 10A moves to a position facing the maintenance unit 30. Then, the cleaner 32 cleans the rubber wiper 31 before a wiping operation.

Subsequently, the head suction cap 34 caps the nozzle face 20*a* of the liquid discharge head 20. In this state, the waste liquid B2 is removed by the above-described suction operation. This operation is performed for each liquid discharge head 20. The waste liquid 132 flows to the drain channel 37*a* via the waste liquid channel 35*a*. The rubber wiper 31 wipes the nozzle face 20*a* of each liquid discharge head 20. The cleaner 32 sprays the cleaning liquid B1 again to the rubber wiper 31 after the wiping operation.

In the above-described operation, the cleaning liquid B1 sprayed to the rubber wiper 31 flows along the rubber wiper 31 to the cleaning liquid channel 33*a* disposed below the rubber wiper 31, and further flows from the outlet 33*a*1 of the cleaning liquid channel 33*a* to the outlet region 35A of the waste liquid channel formation component 35. In the above description, the cleaner 32 cleans the rubber wiper 31 before and after the wiping operation by the rubber wiper 31 and the suction operation of the waste liquid B2 from the liquid discharge head 20. However, the cleaner 32 may clean the rubber wiper 31 at an appropriate point in time.

Figure 7:
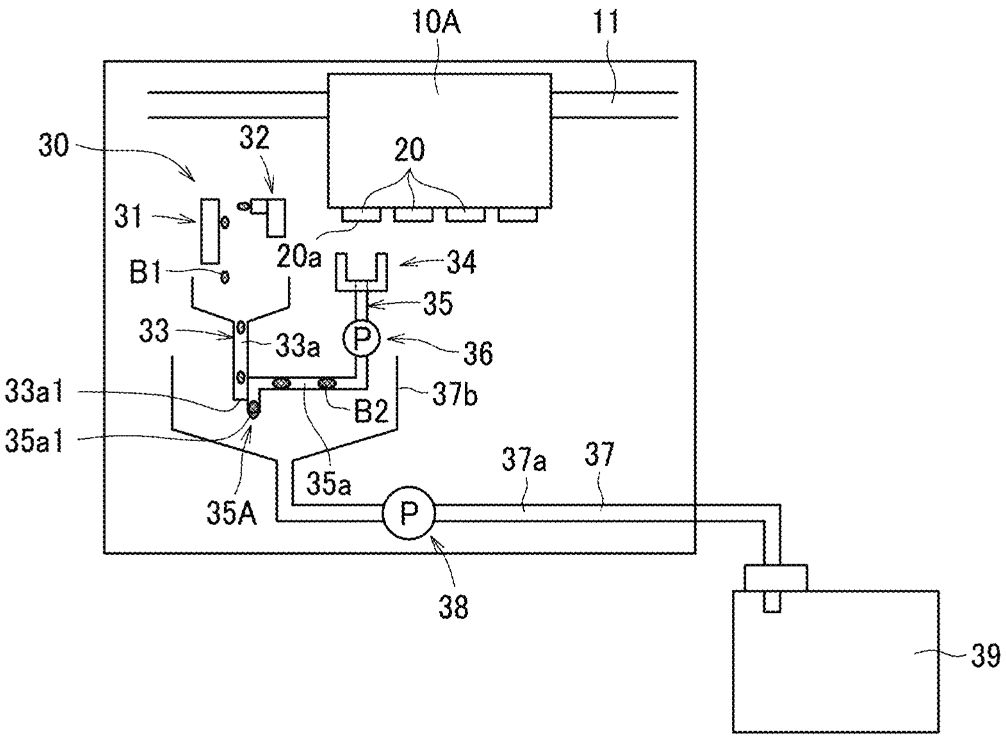
FIG. 7 is a schematic view of a maintenance unit according to a modification of the embodiment of FIG. 5.

A modification of the maintenance unit 30 is described below. As illustrated in FIG. 7, in the present embodiment, the outlet 33*a*1 of the cleaning liquid channel 33*a* is disposed adjacent to the waste liquid channel 35*a*, specifically adjacent the waste liquid channel 35*a* near the outlet 35*a*1. The outlet 33*a*1 of the cleaning liquid channel 33*a* is disposed higher than the outlet region 35A of the waste liquid channel formation component 35. The cleaning liquid B1 flows from the outlet 33*a*1 toward the outlet region 35A under gravity.

In the present embodiment, the cleaning liquid B1 drained from the outlet 33*a*1 of the cleaning liquid channel 33*a* flows to the outlet region 35A of the waste liquid channel formation component 35 along the outer circumferential face of the waste liquid channel formation component 35, thereby cleaning the outlet region 35A. As a result, similarly to the above-described embodiment, the waste liquid B2 is prevented from adhering to and accumulating on the outlet region 35A. In the present embodiment, the outlet 33*a*1 of the cleaning liquid channel 33*a* is, but not limited to, adjacent to the waste liquid channel 35*a* near the outlet 35*a*1. The cleaning liquid B1 drained from the outlet 33*a*1 of the cleaning liquid channel 33*a* may flow to the outlet region 35A along other components besides the outer circumferential face of the waste liquid channel formation component 35.

Modifications of the outlet 33*a*1 of the cleaning liquid channel formation component 33 and the outlet region 35A of the waste liquid channel formation component 35 according to the embodiment illustrated in FIG. 7 are described below.

Figure 8:
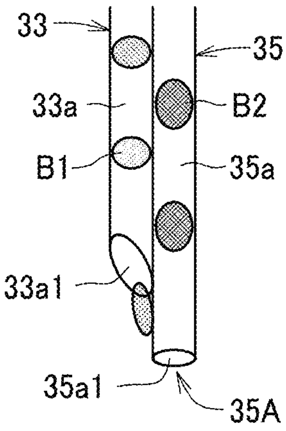
FIG. 8 is a diagram illustrating a modification of an outlet of a cleaning liquid channel of the maintenance unit illustrated in FIG. 7.

In the embodiment illustrated in FIG. 8, the outlet 33*a*1 of the cleaning liquid channel 33*a* is inclined. A portion of the outlet 33*a*1 on the side of the waste liquid channel formation component 35, in particular, the portion of the outlet 33*a*1 adjacent to the waste liquid channel 35*a* is lower than the other portions of the outlet 33*a*1. In other words, the outlet 33*a*1 has a slanted face slanted toward the outlet 35*a*1. Such a configuration facilitates the cleaning liquid B1, which is drained from the cleaning liquid channel 33*a*, flowing to the outlet region 35A of the waste liquid channel formation component 35 along the outer circumferential face of the waste liquid channel formation component 35. For example, a part of the cleaning liquid channel formation component 33 having a shape as illustrated in FIG. 7 is cut out on the outlet 33*a*1 side to form the inclined outlet 33*a*1. The portion of the outlet 33*a*1 adjacent to the waste liquid channel 35*a* may not be lowest.

Figure 9:
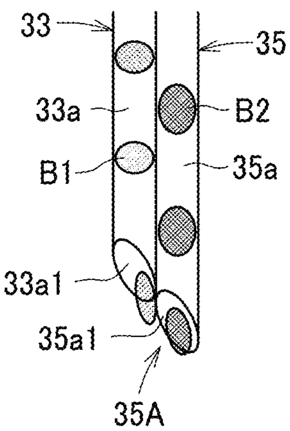
FIG. 9 is a diagram illustrating a modification of the outlets of the cleaning liquid channel and a waste liquid channel of the maintenance unit illustrated in FIG. 7.

In the embodiment illustrated in FIG. 9, the outlet 35*a*1 of the waste liquid channel 35*a* is inclined. A portion of the outlet 35*a*1 of the waste liquid channel 35*a* on the side of the cleaning liquid channel 33*a*, in particular, the portion of the outlet 35*a*1 of the waste liquid channel 35*a* adjacent to the cleaning liquid channel 33*a* is higher than the other portions of the outlet 35*a*1. In other words, the outlet 35*a*1 has another slanted face slanted in a direction parallel to the slanted face of the outlet 33*a*1. Such a configuration facilitates the cleaning liquid B1, which flows from the cleaning liquid channel 33*a* to the outlet 35*a*1 of the waste liquid channel 35*a*, flowing from the portion of the outlet 35*a*1 of the waste liquid channel 35*a* adjacent to the cleaning liquid channel 33*a* toward the opposite portion (the right side of the outlet 35*a*1 in FIG. 9). Accordingly, the cleaning liquid B1 can be spread over a wider range of the outlet region 35A of the waste liquid channel formation component 35. The portion of the outlet 35*a*1 of the waste liquid channel 35*a* adjacent to the cleaning liquid channel 33*a* may not be highest. In FIG. 9, the outlet 33*a*1 of the cleaning liquid channel 33*a* is also inclined, but may be flat as illustrated in FIG. 7.

Figure 10:
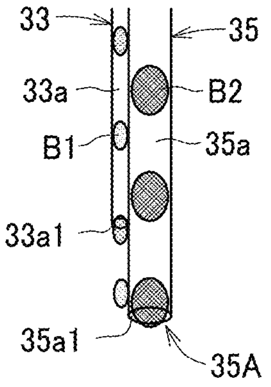
FIG. 10 is a diagram illustrating another modification of the outlet of the cleaning liquid channel of the maintenance unit illustrated in FIG. 7.

As illustrated in FIG. 10, a diameter of the cleaning liquid channel 33*a*, in particular, the diameter of the cleaning liquid channel 33*a* on the outlet 33*a*1 side can be smaller than a diameter of the waste liquid channel 35*a*. Such a configuration facilitates the cleaning liquid B1 flowing to the outlet region 35A along the outer circumferential face of the waste liquid channel formation component 35.

Figure 11:
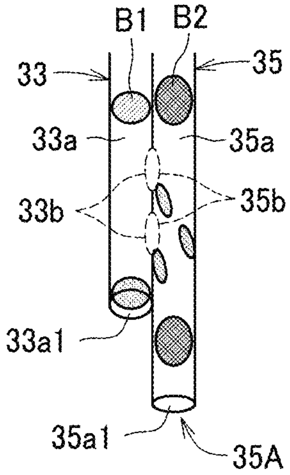
FIG. 11 is a diagram illustrating another modification of the outlets of the cleaning liquid channel and the waste liquid channel of the maintenance unit illustrated in FIG. 7.

As illustrated in FIG. 11, a communication path for connecting the cleaning liquid channel 33*a* and the waste liquid channel 35*a* may be disposed in the middle of the channels (i.e., the cleaning liquid channel 33*a* and the waste liquid channel 35*a*). Specifically, a communication hole 33*b* (i.e., a first communication hole) is disposed in the cleaning liquid channel formation component 33, a communication hole 35*b* (i.e., a second communication hole) is disposed in the waste liquid channel formation component 35, and the communication hole 33*b* and the communication hole 35*b* are opposed to each other. Accordingly, the cleaning liquid B1 flowing through the cleaning liquid channel 33*a* flows to the waste liquid channel 35*a* in the middle of the channels. The waste liquid B2 flowing through the waste liquid channel 35*a* is mixed with the cleaning liquid B1, and thus the waste liquid B2 is less likely to dry and adhere.

Such a configuration according to the present embodiment prevents the waste liquid B2 from adhering to and accumulating on the outlet region 35A. In addition, similarly to the above-described embodiment, the cleaning liquid B1 is also drained from the outlet 33*a*1 and flows to the outlet region 35A of the waste liquid channel formation component 35 along the outer circumferential face of the waste liquid channel formation component 35, thereby cleaning the outlet region 35A.

Figure 12:
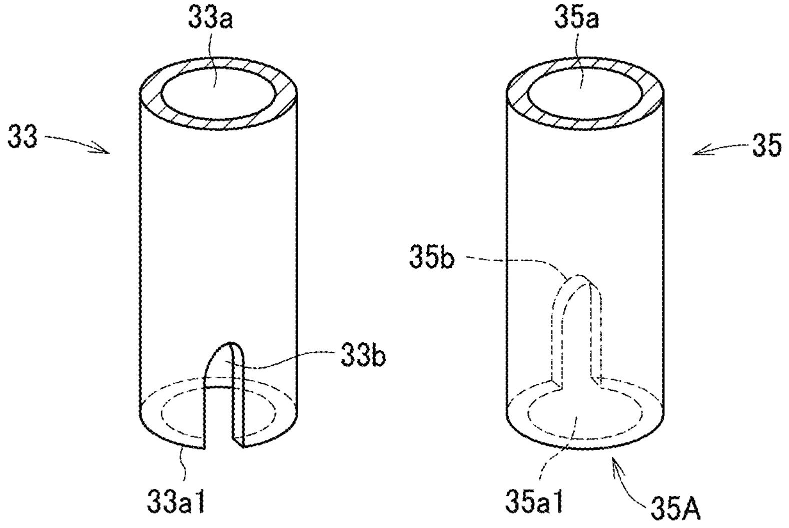
FIG. 12 is a diagram illustrating yet another modification of the outlets of the cleaning liquid channel and the waste liquid channel of the maintenance unit illustrated in FIG. 7.

In FIG. 11, the communication holes 33*b* and 35*b* are disposed in the middle of the cleaning liquid channel 33*a* and the waste liquid channel 35*a*, respectively, but may be disposed at the outlets 33*a*1 and 35*a*1. The communication hole 33*b* and the communication hole 35*b* are opposed to each other. As illustrated in FIG. 12, the cleaning liquid channel formation component 33 and the waste liquid channel formation component 35 respectively have a communication hole 33*b* which is cutout continuous with the outlet 33*a*1 and a communication hole 35*b* which is cutout continuous with the outlet 35a1. In the present embodiment, the cleaning liquid B1 and the waste liquid B2 can be mixed at the outlets 33a1 and 3a1 of the cleaning liquid channel 33a and the waste liquid channel 35a.

The cleaning liquid channel formation component 33 or the waste liquid channel formation component 35 may have a combination of multiple features of the above-described embodiments illustrated in FIGS. 8 to 12.

Figure 13:
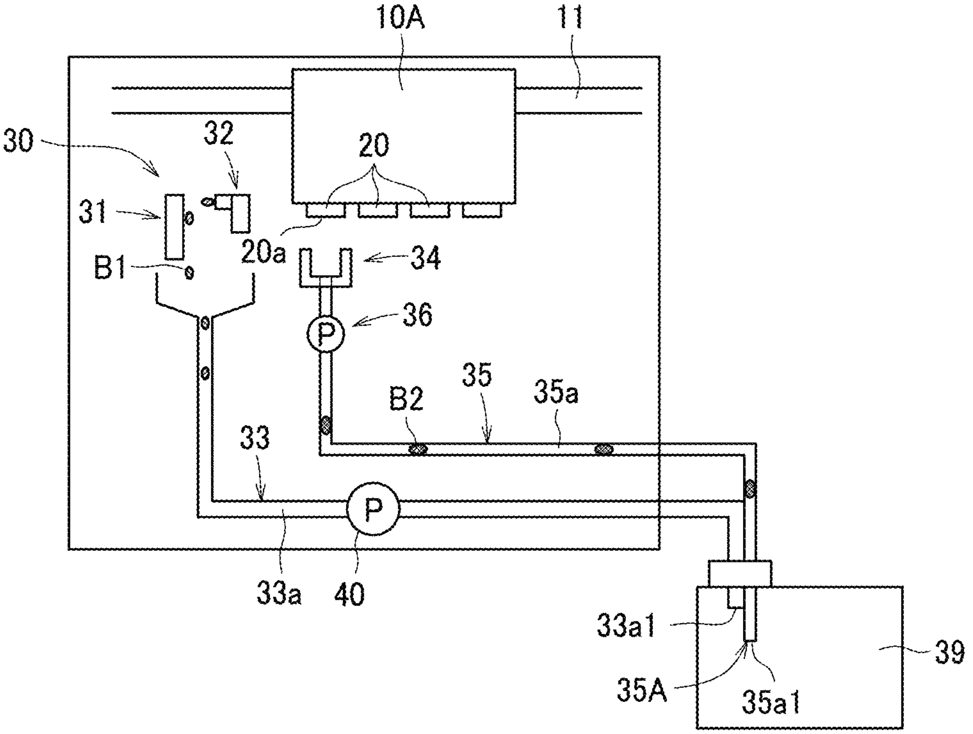
FIG. 13 is a schematic view of a maintenance unit according to another modification of the embodiment of FIG. 5.

In the embodiment illustrated in FIG. 13, the cleaning liquid channel 33a and the waste liquid channel 35a join into one in the waste liquid bottle 39 disposed outside the apparatus body 50 of the liquid discharge apparatus 1. The cleaning liquid channel 33a is provided with a drain pump 40 to drain the cleaning liquid B1 to the waste liquid bottle 39.

Also in the present embodiment, the outlet 33a1 of the cleaning liquid channel 33a is disposed adjacent to the waste liquid channel 35a in the waste liquid bottle 39. Accordingly, similarly to the above-described embodiment, the cleaning liquid B1 flowing through the cleaning liquid channel 33a flows to the outlet region 35A of the waste liquid channel formation component 35. The shape of the outlet 33a1 of the cleaning liquid channel 33a or the outlet 35a1 of the waste liquid channel 35a can be selected from the embodiments illustrated in FIGS. 8 to 10.

In the present embodiment, the receiver 37b illustrated in FIG. 5 is unnecessary in the apparatus body 50 of the liquid discharge apparatus 1 to receive the cleaning liquid B1 and the waste liquid B2 from the cleaning liquid channel 33a and the waste liquid channel 35a joining into one. Accordingly, the apparatus body 50 of the liquid discharge apparatus 1 can be downsized.

Figure 14:
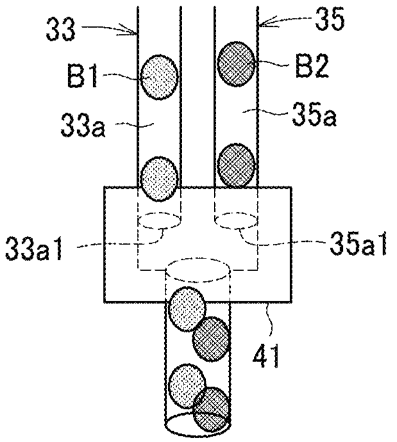
FIG. 14 is a schematic view of a junction of the cleaning liquid channel and the waste liquid channel according to an embodiment of the present disclosure.

In the embodiment illustrated in FIG. 14, the outlet 33a1 of the cleaning liquid channel 33a and the outlet 35a1 of the waste liquid channel 35a are disposed in a junction 41. In the junction 41, the cleaning liquid channel 33a and the waste liquid channel 35a join into one (i.e., a merged channel) with pipe fittings. The junction 41 (i.e., a sealed junction) is sealed.

In the present embodiment, the junction 41 is sealed so that the outlet region 35A of the waste liquid channel formation component 35 is not exposed to the outside air. As a result, the waste liquid B2 is prevented from drying and adhering to the outlet region 35A. In the merged channel downstream from the junction 41, the waste liquid B2 and the cleaning liquid B1 are mixed with each other, thereby preventing the mixed liquid from drying and adhering. The term "the junction 41 is sealed" represents that the inside of the junction 41 is closed to such an extent that the outlet region 35A is not exposed to the outside air, and does not represent only that the junction 41 is completely separated from the outside without a clearance.

The above-described embodiments are illustrative and do not limit the present disclosure. Numerous additional modifications and variations are possible in light of the above teachings. It is therefore to be understood that within the scope of the appended claims.

In the present disclosure, the liquid to be discharged is not limited to a particular liquid as long as the liquid has a viscosity or surface tension to be discharged from a head (liquid discharge head). However, preferably, the viscosity of the liquid is not greater than 30 mPa·s under ordinary temperature and ordinary pressure or by heating or cooling. Examples of the liquid to be discharged include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "liquid" includes not only ink but also paint, a pretreatment liquid, a binder, and an overcoat liquid.

In the present disclosure, the term "liquid discharge apparatus" includes a carriage including a liquid discharge head and drives the liquid discharge head to discharge liquid. The term "liquid discharge apparatus" used in the present disclosure includes, in addition to apparatuses to discharge liquid to a recording medium serving as materials onto which liquid can adhere, apparatuses to discharge the liquid into gas (air) or liquid.

For example, the "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

Aspects of the present disclosure are, for example, as follows.

Aspect 1

A liquid discharge apparatus includes a liquid discharge head, a cap, a waste liquid channel, a wiper, a cleaner, and a cleaning liquid drainage. The liquid discharge head has a nozzle, from which a liquid is discharged, on a nozzle face. The cap caps the nozzle to suck a waste liquid from the nozzle. The waste liquid channel is connected to the cap and has a waste liquid outlet from which the waste liquid is drained. The wiper wipes the nozzle face. The cleaner applies a cleaning liquid to the wiper. The cleaning liquid drainage drains the cleaning liquid applied to the wiper to the waste liquid outlet.

Aspect 2

In the liquid discharge apparatus according to Aspect 1, the cleaning liquid drainage includes a cleaning liquid channel through which the cleaning liquid applied to the wiper flows. The cleaning liquid channel has a cleaning liquid outlet from which the cleaning liquid is drained. The cleaning liquid outlet is disposed directly above the waste liquid outlet.

Aspect 3

In the liquid discharge apparatus according to Aspect 1, the cleaning liquid drainage includes a cleaning liquid channel through which the cleaning liquid applied to the wiper flows. The cleaning liquid channel has a cleaning liquid outlet from which the cleaning liquid is drained. The cleaning liquid outlet is disposed adjacent to the waste liquid channel.

Aspect 4

In the liquid discharge apparatus according to Aspect 3, the cleaning liquid outlet is disposed higher than the waste liquid outlet.

Aspect 5

In the liquid discharge apparatus according to Aspect 4, the cleaning liquid outlet has a slanted face slanted toward the waste liquid outlet.

Aspect 6

In the liquid discharge apparatus according to Aspect 4 or 5, the waste liquid outlet has another slanted face slanted in a direction parallel to the slanted face of the cleaning liquid outlet.

Aspect 7

In the liquid discharge apparatus according to any one of Aspects 4 to 6, a diameter of the cleaning liquid channel is smaller than a diameter of the waste liquid channel.

Aspect 8

In the liquid discharge apparatus according to any one of Aspects 4 to 7, the cleaning liquid channel has a first communication hole. The waste liquid channel has a second communication hole opposed to the first communication hole to fluidly connect the first communication hole and the second communication hole.

Aspect 9

In the liquid discharge apparatus according to Aspect 3, the cleaning liquid outlet and the waste liquid outlet are in a waste liquid bottle outside the liquid discharge apparatus.

Aspect 10

In the liquid discharge apparatus according to Aspect 1, the cleaning liquid drainage includes a cleaning liquid channel through which the cleaning liquid applied to the wiper flows. The cleaning liquid channel has a cleaning liquid outlet from which the cleaning liquid is drained. The cleaning liquid drainage further includes a sealed junction having a closed space accommodating the cleaning liquid outlet and the waste liquid outlet and a merged channel through which a mixed liquid mixing the cleaning liquid and the waste liquid in the sealed junction flows.

Aspect 11

A cleaning method of a liquid discharge apparatus includes capping a nozzle on a nozzle face of a liquid discharge head, sucking a waste liquid from the nozzle while the nozzle is capped, draining the waste liquid from a waste liquid outlet through a waste liquid channel, wiping the nozzle face with a wiper, applying a cleaning liquid to the wiper, and draining the cleaning liquid applied to the wiper to the waste liquid outlet.

As described above, according to one aspect of the present disclosure, the waste liquid is prevented from adhering to the waste liquid outlet of the waste liquid channel.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A liquid discharge apparatus comprising:

a liquid discharge head including a nozzle, from which a liquid is discharged, on a nozzle face;

a cap to cap the nozzle to suck a waste liquid from the nozzle;

a waste liquid channel connected to the cap and including a waste liquid outlet from which the waste liquid is drained;

a wiper to wipe the nozzle face;

a cleaner to apply a cleaning liquid to the wiper; and a cleaning liquid drainage to drain the cleaning liquid applied to the wiper to the waste liquid outlet, wherein:

the cleaning liquid drainage includes a cleaning liquid channel through which the cleaning liquid applied to the wiper flows, the cleaning liquid channel includes a cleaning liquid outlet from which the cleaning liquid is drained, and the cleaning liquid outlet is disposed adjacent to the waste liquid channel.

2. The liquid discharge apparatus according to claim 1, wherein:

the cleaning liquid outlet is disposed directly above the waste liquid outlet.

3. The liquid discharge apparatus according to claim 1, wherein:

the cleaning liquid outlet is disposed higher than the waste liquid outlet.

4. The liquid discharge apparatus according to claim 3, wherein:

the cleaning liquid outlet includes a slanted face slanted toward the waste liquid outlet.

5. The liquid discharge apparatus according to claim 4, wherein:

the waste liquid outlet includes another slanted face slanted in a direction parallel to the slanted face of the cleaning liquid outlet.

6. The liquid discharge apparatus according to claim 3, wherein;

a diameter of the cleaning liquid channel is smaller than a diameter of the waste liquid channel.

7. The liquid discharge apparatus according to claim 3, wherein;

the cleaning liquid channel includes a first communication hole, and the waste liquid channel includes a second communication hole opposed to the first communication hole to fluidly connect the first communication hole and the second communication hole.

8. The liquid discharge apparatus according to claim 1, wherein:

the cleaning liquid outlet and the waste liquid outlet are in a waste liquid bottle outside the liquid discharge apparatus.

9. The liquid discharge apparatus according to claim 1, wherein the cleaning liquid drainage includes:

a cleaning liquid channel through which the cleaning liquid applied to the wiper flows, the cleaning liquid channel including a cleaning liquid outlet from which the cleaning liquid is drained;

a sealed junction including a closed space accommodating the cleaning liquid outlet and the waste liquid outlet; and a merged channel through which a mixed liquid mixing the cleaning liquid and the waste liquid in the sealed junction flows.

10. A cleaning method of a liquid discharge apparatus comprising:

capping a nozzle on a nozzle face of a liquid discharge head;

sucking a waste liquid from the nozzle while the nozzle is capped;

draining the waste liquid from a waste liquid outlet through a waste liquid channel;

wiping the nozzle face with a wiper;

applying a cleaning liquid to the wiper; and draining the cleaning liquid applied to the wiper to the waste liquid outlet, wherein the draining the cleaning liquid applied to the wiper to the waste liquid outlet comprises flowing the cleaning liquid applied to the wiper through a cleaning liquid channel including a cleaning liquid outlet from which the cleaning liquid is drained, the cleaning liquid outlet being adjacent to the waste liquid channel.

11. The cleaning method according to claim 10, wherein:

the cleaning liquid outlet is disposed directly above the waste liquid outlet.

12. The cleaning method according to claim 10, wherein:

the cleaning liquid outlet is disposed higher than the waste liquid outlet.

13. The cleaning method according to claim 12, wherein:

the cleaning liquid outlet includes a slanted face slanted toward the waste liquid outlet.

14. The cleaning method according to claim 13, wherein:

the waste liquid outlet includes another slanted face slanted in a direction parallel to the slanted face of the cleaning liquid outlet.

15. The cleaning method according to claim 12, wherein:

a diameter of the cleaning liquid channel is smaller than a diameter of the waste liquid channel.

16. The cleaning method according to claim 12, wherein:

the cleaning liquid channel includes a first communication hole, and the waste liquid channel includes a second communication hole opposed to the first communication hole to fluidly connect the first communication hole and the second communication hole.

17. The cleaning method according to claim 10, wherein:

the cleaning liquid outlet and the waste liquid outlet are in a waste liquid bottle outside the liquid discharge apparatus.

18. The cleaning method according to claim 10, wherein the cleaning liquid drainage includes:

a cleaning liquid channel through which the cleaning liquid applied to the wiper flows, the cleaning liquid channel including a cleaning liquid outlet from which the cleaning liquid is drained;

a sealed junction including a closed space accommodating the cleaning liquid outlet and the waste liquid outlet; and a merged channel through which a mixed liquid mixing the cleaning liquid and the waste liquid in the sealed junction flows.

* * * * *